United States Patent [19]

Farrell

[11] Patent Number: 4,504,011
[45] Date of Patent: Mar. 12, 1985

[54] AIR CONDITIONING SYSTEM FOR POULTRY HOUSES

[76] Inventor: Ronald A. Farrell, 1043 S. Craig, Springfield, Mo. 65804

[21] Appl. No.: 402,895

[22] Filed: Jul. 29, 1982

[51] Int. Cl.³ .............................................. A01K 41/02
[52] U.S. Cl. ........................................ 237/14; 237/50; 119/39; 98/40.19
[58] Field of Search .............. 237/14, 3, 4; 119/39, 119/40; 98/40 C, DIG. 8

[56] References Cited

U.S. PATENT DOCUMENTS

| 2,566,453 | 9/1951 | Ketay | 237/3 |
| 2,938,449 | 5/1960 | Newell | 98/40 C |
| 4,307,701 | 12/1981 | Balon et al. | 98/40 C |

FOREIGN PATENT DOCUMENTS

| 1103515 | 4/1954 | France | 119/39 |

*Primary Examiner*—Henry Bennett

[57] ABSTRACT

An air conditioning system for a poultry house. Plenum structure extends substantially the entire length of the poultry house. A forced-air heating unit is coupled to the plenum structure by flexible conduit. The heated air is controlled by slidable adjustment structure to provide substantially even heat along the entire length of the plenum structure.

1 Claim, 6 Drawing Figures

AIR CONDITIONING SYSTEM FOR POULTRY HOUSES

BACKGROUND OF THE INVENTION

1. Field of the Invention

The present invention relates, in general, to air conditioning systems for poultry houses used as broiler houses, chick nurseries or the like.

2. Description of the Prior Art

A typical poultry house may be 40 feet wide and 300 feet long. When such poultry houses are used as broiler houses or chick nurseries, the chicks are brought in when only a few hours old and remain in the poultry house until they are 6 to 10 weeks old. For approximately the first week, the chicks require a substantially constant temperature of about 90° F. There are substantial problems and costs involved in maintaining such substantially constant temperature in such poultry houses. Heretofore, poultry houses used as chick nurseries or the like have been heated by either a substantially conventional central air heating system or the like which heats the entire poultry house or by numerous small, pan-like propane gas or electric heaters which heat numerous small areas along the length of the poultry house.

SUMMARY OF THE INVENTION

The present invention is directed toward providing a heating system that will reduce the cost of heating poultry houses while maintaining substantially constant temperature and producing healthier birds. A basic concept of the present invention is to force conditioned air through elongated brooder structure which extends lengthwise of a poultry house whereby a substantially constant temperature can be maintained beneath the brooder structure.

Another basic concept of the present invention is to provide means for releasing conditioned air low as to reduce the primary heated area in the poultry house to that only required by the needs of the birds.

The heating system of the present invention comprises, in general, a plenum means for extending substantially the entire length of a house, and an air conditioning means for forcing conditioned air through the plenum means, the plenum means including first and second plenum chambers, the first plenum chamber having an opened bottom for providing conditioned air to the house, the air conditioning means including a conduit means for allowing heated air to enter the second plenum chamber, the plenum means including controlled transfer means for allowing conditioned air to pass from the second plenum chamber to the first plenum chamber at a controlled rate.

DESCRIPTION OF THE PREFERRED EMBODIMENT

Figure 1:
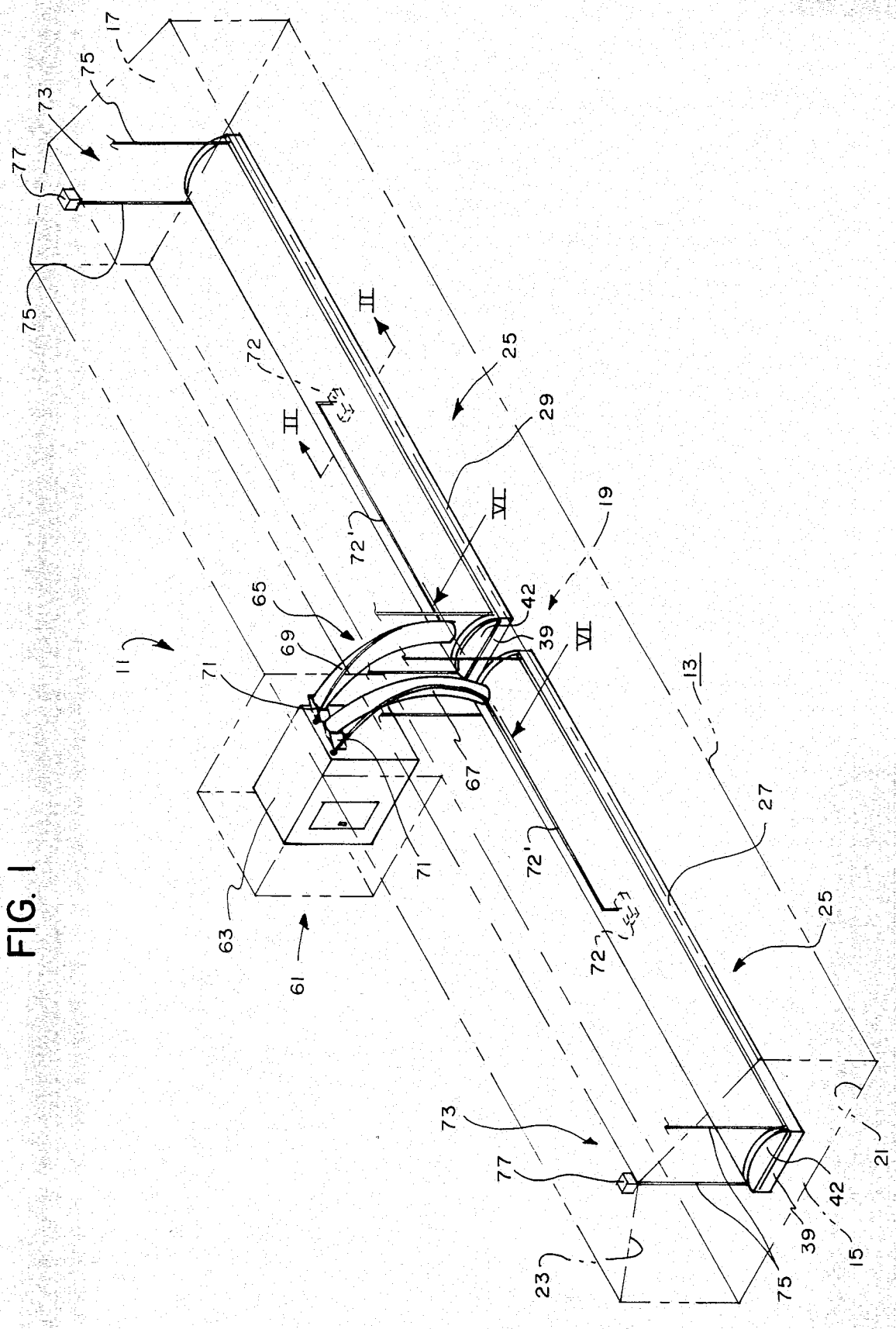
FIG. 1 is a somewhat schematic perspective view of the air conditioning system of the present invention, showing a poultry house in broken lines.

The air conditioning system 11 of the present invention is preferably for use with an elongated poultry house 13 having a first end 15, a second end 17, a mid-portion 19, floor 21, and a ceiling 23 (see, in general, FIG. 1). The poultry house 13 can be of any well-known construction and size. The air conditioning system 11 is especially for use when the poultry house 13 is used as a chick nursery or brooder.

The air conditioning system 11 includes plenum means 25 for extending substantially the entire length of the poultry house 13 (see, in general, FIG. 1). The plenum means 25 may consist of one long unit extending the entire length of the house 13, may be installed in only the middle third of the house 13, or may be divided into two or more sections with walkways between the sections for the convenience of the workers in the house 13, depending on various factors such as the size of the house 13. Thus, the plenum means 25 may include a first plenum member 27 for extending substantially from the first end 15 of the poultry house 13 to the mid-portion 19 thereof, and a second plenum member 29 for extending substantially from the second end 17 of the poultry house 13 to the mid-portion 19 thereof (see FIG. 1). Each plenum member 27, 29 is preferably divided into a first plenum chamber 31 and a second plenum chamber 33 both extending the entire length thereof (see FIGS. 2 and 6). The first plenum chamber 31 has an opened bottom 35 for providing conditioned air somewhat adjacent the floor 21 of the poultry house 13 in a manner which will hereinafter become apparent. Each plenum member 27, 29 preferably includes control transfer means 37 for allowing conditioned air to pass from the second plenum chamber 33 to the first plenum chamber 31 at a controlled rate. The first plenum chamber 31 preferably includes flexible side members 39. The second plenum chamber 33 is preferably movable between an expanded position when air is being forced therethrough and a collapsed position as shown in broken lines in FIG. 2 when air is not being forced therethrough to allow the members 27, 29 to be raised high enough to allow room for personnel and machinery to work beneath them.

Figure 2:
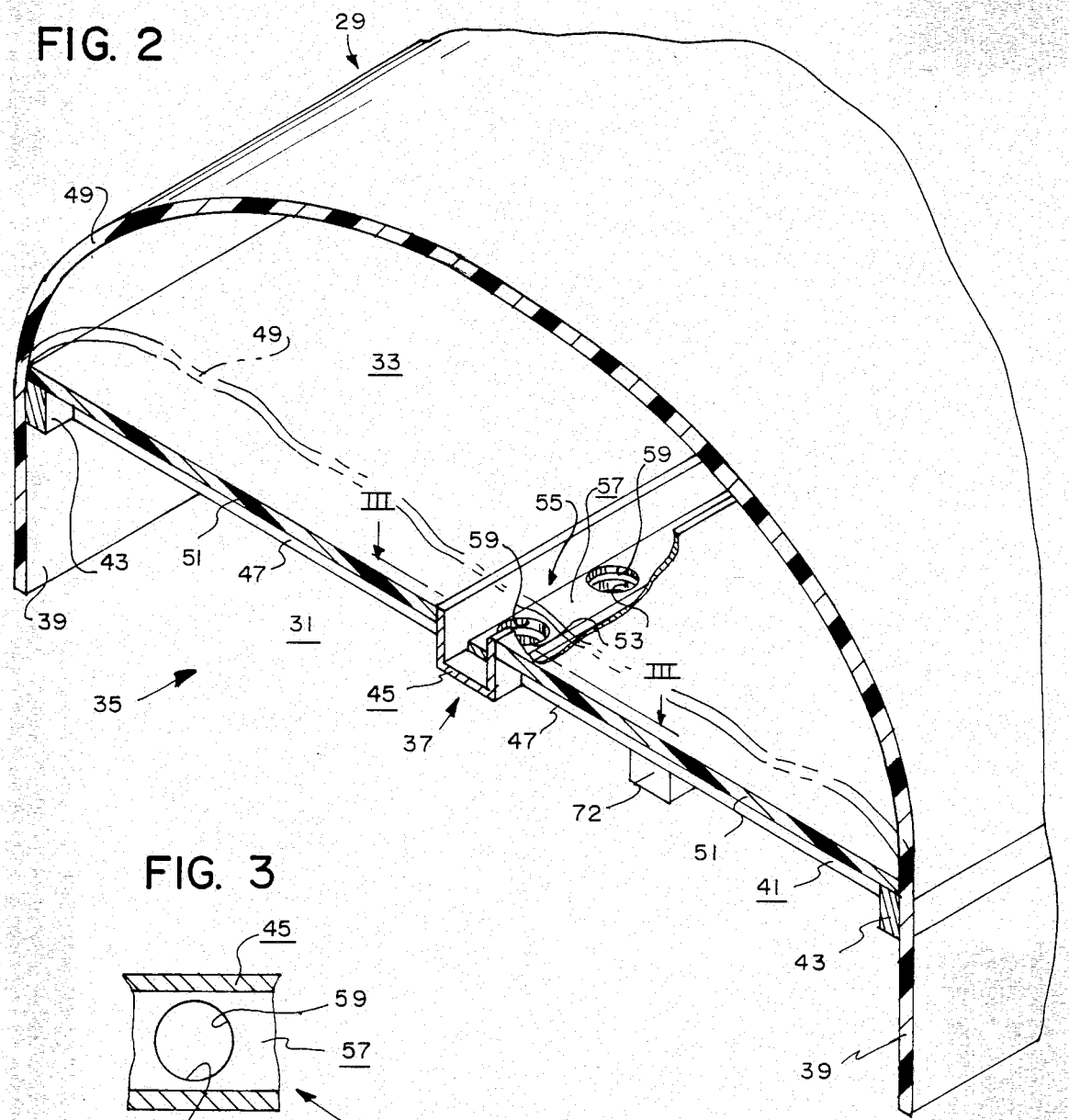
FIG. 2 is an enlarged sectional view substantially as taken on line II—II of FIG. 1.
Figure 6:
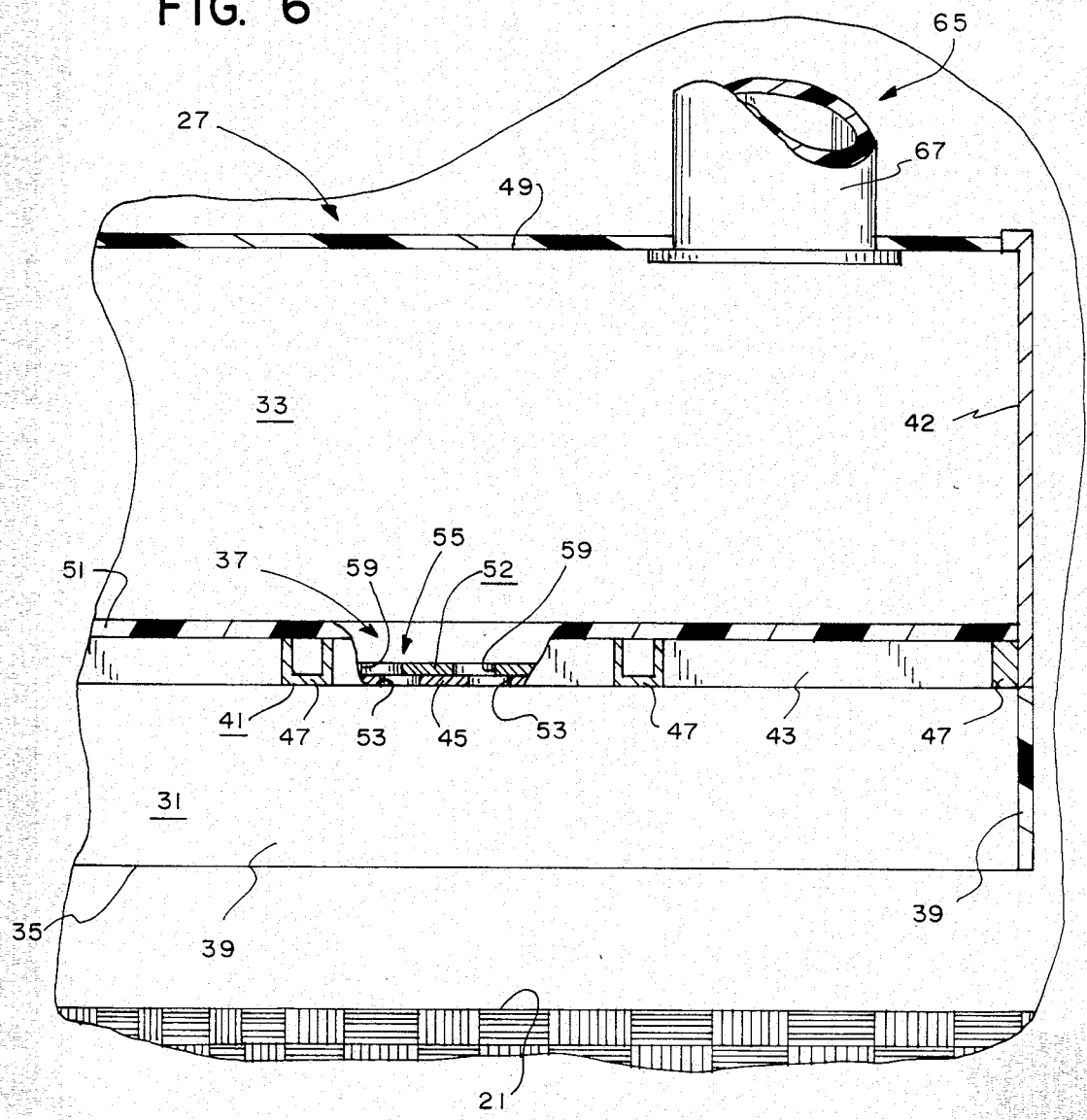
FIG. 6 is an enlarged sectional view substantially as taken on line VI—VI of FIG. 1.

Each plenum member 27, 29 is preferably constructed with an open, substantially rigid (e.g., metal or plastic) frame means 41 (see FIGS. 2 and 6). The frame means 41 preferably includes a pair of elongated side frame members 45, an elongated upwardly directed U-shaped channel member 45 positioned substantially midway between the side frame members 43 and being coextensive therewith, and a plurality of cross frame members 47 extending between and rigidly joining the side frame members 43 and channel member 45 to one another. The side frame members 43, channel members 45 and cross frame members 47 may be joined to one another in any manner apparent to those skilled in the art, such as by welding or the like. A flexible, air impermeable cover member 49 is preferably provided over the frame means 41, loosely extending from one side frame member 43 to the other side frame member 43 the entire length of the plenum members 27, 29. A pair of air impermeable intermediate members 51 extends between the side frame members 43 and the channel member 45 the entire length of the plenum members 27, 29. The channel member 45, cover member 49 and intermediate members 51 coact to define the outer boundary of the second plenum chamber 33. The side members 39 are preferably of air impermeable material and extend downwardly from the side frame members 43 the entire length of the plenum members 27,29. The side members 39, channel member 45 and intermediate members 51 coact with the floor 21 to define the outer boundary of first plenum chamber 31. The side members 39, cover member 49 and intermediate members 51 are preferably constructed of any well-known flexible air impermeable plastic or the like and are attached to the frame means 41 in any manner apparent to those skilled in the art, such as by gluing or the like. Means are provided to substantially seal the opposite ends of the plenum chambers 31,33. Thus, platelike members 42 may be provided to seal the ends of the second plenum chamber 33 (see, in general, FIG. 6) and the side members 39 may extend around the ends of the first plenum chamber 31 to provide a substantial seal thereof (see, in general, FIG. 6).

A plurality of spaced-apart apertures 53 are preferably provided through the channel member 45 along its entire length (see, in general, FIGS. 2 and 6) for allowing air to pass from the second plenum chamber 33 to the first plenum chamber 31. A slide means 55 is preferably provided adjacent the channel member 45 for selectively closing portions of the apertures 53 to control the flow of air therethrough. The slide means 55 may consist simply of one or more slide members 57 having a plurality of apertures 59 therethrough that correspond in size and spacing to the apertures 53 through the channel member 45 whereby the slide member 57 can be moved to, in effect, vary or control the size of the apertures 53 in a manner which should now be apparent to those skilled in the the art. The channel member 45 and slide means 55 thus coact to define the control transfer means 37.

The air conditioning system 11 includes air conditioning means 61 for forcing conditioned air through the plenum means 25 (see FIG. 1). The air conditioning means 61 preferably includes a heater unit 63 for heating air. The heater unit 63 is preferably located substantially adjacent the mid-portion 19 of the poultry house 13. The heating unit may be of conventional operation and construction and may utilize gas, wood, coal or the like to heat the air. The air conditioning means 63 may also include a cooler unit (not shown) for cooling air. The cooling unit may be of any conventional construction and operation known to those skilled in the art. The air conditioning means 61 preferably includes conduit means 65 for allowing conditioned air to pass from the heater unit 63 and cooler unit to the plenum means 25. Preferably, the conduit means 65 includes a first conduit member 67 extending between the heater unit 63 and the second plenum chamber 33 of the first plenum member 27 and a second conduit member 69 extending between the heater unit 63 and the second plenum chamber 33 of the second plenum member 29. The conduit members 67, 69 are preferably constructed of a flexible, high-temperature resistive material and may consist simply of the typical, well-known flexible conduit piping used for clothes dryer exhaust connections. The air conditioning means 61 preferably includes fan means 71 of any typical construction for blowing conditioned air from the heater unit 63 and cooler unit through the conduit means 65 and the plenum means 25. The air conditioning means 63 is preferably adapted in any manner well-known to those skilled in the art to allow the fan means 71 to also force fresh air through the conduit means 65 and the plenum means 25.

Heat sensors 72 of typical construction and operation may be provided within each plenum member 27, 29 (see, in general, FIGS. 1 and 2) for sensing the temperature of the air within each plenum member 27, 29. The heat sensors 72 may be of a well-known solid-state, electrical type and are preferably electrically coupled to the air conditioning means 61 by electrical wires 72' or the like for providing control over the air conditioning means 61 in a manner as will be well-known to those skilled in the art. A sensor 72 is preferably provided in the first plenum chamber 31 of each plenum member 27, 29 substantially midway between the opposite ends thereof.

The air conditioning system 11 preferably includes adjustable support means 73 for supporting the plenum means 25 above the floor 21 of the poultry house 13 at various heights (see FIG. 1). The adjustable support means 73 preferably includes a plurality of cables 75 attached to the first and second plenum members 27, 29 and extending substantially to the ceiling 23 of the poultry house. The adjustable support means 73 also preferably includes winch means 77 for selectively winding up the cables 75 to lift the plenum members 27, 29 above the floor 21 of the poultry house 13. The winch means 77 preferably includes one typical electric-powered winch member for each plenum member 27, 29 to coact with the cables 75 to allow the entire system to be raised at once. The cables 75 may be positioned about every 8 to 10 feet along the length of the members 27, 29. The members 27, 29 are somewhat flexible to allow the length of the various cables 75 to be adjusted so that the side members 39 can be maintained the same height above the floor along the entire length of the members 27, 29 even though the floor 21 may be unlevel (the floor 21 is normally of dirt covered with a bedding of rice hulls, sawdust or the like and is normally uneven) thus preventing the conditioned air from escaping from beneath the chambers 31 at an uneven rate along the length of the members 27, 29.

Figure 3:
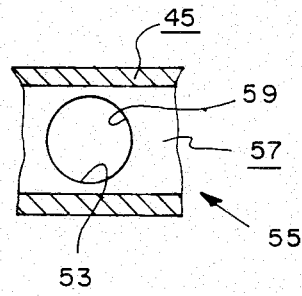
FIG. 3 is a sectional view substantially as taken on line III—III of FIG. 2.
Figure 4:
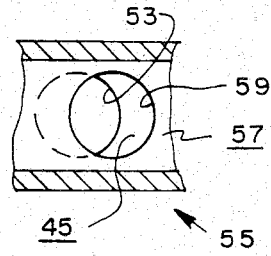
FIG. 4 is a sectional view similar to FIG. 3 but with portions thereof in a moved position.
Figure 5:
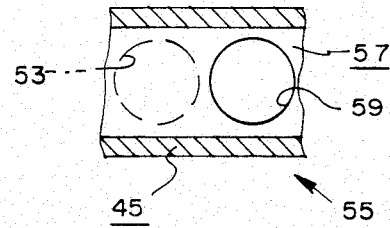
FIG. 5 is a sectional view similar to FIGS. 3 and 4 but with portions thereof in a moved position.

Operation and use of the air conditioning system 11 is quite simple. First, the control transfer means 37 should be adjusted so that the heat of the air along the entire length of the plenum means 25 adjacent the first plenum chamber 31 remains substantially constant. Thus, for example, if the temperature of the air being forced through the plenum means 25 is reduced the farther it travels from the heater unit 63, the control transfer means 37 may be adjusted to allow more air flow from the second plenum chamber 33 to the first plenum chamber 31 at a rate substantially proportional to the distance from the heater unit 63. This is done by moving the slide members 57 with respect to the channel member 45 (see, in general, FIGS. 3, 4 and 5) so that the effective size of the apertures 53 through the channel member 45 that are closest to the heater unit 63 are proportionally smaller than the effective size of the apertures 53 through the channel member 45 that are farthest from the heater unit 63. Once the slide members 57 have been properly adjusted, screws or the like (not shown) may be used to fixedly attach the slide members 57 to the channel member 45. It should be noted that, for ease of construction, the plenum members 27, 29 may each be constructed in a number of segments (e.g., each plenum member 27, 29 may consist of fifteen segments each ten feet long) and each segment may include one slide member 57 to control the air flow for that entire segment. As thus constructed, the members 27,29 are somewhat flexible along their lengths, thus allowing adjustments for use with unlevel floors 21 or the like.

At the start of the brooding cycle, the first and second plenum members 27, 29 are lowered until the flexible side members 39 substantially contact the floor 21 of the poultry house 13 and the air conditioning means 61 is adjusted so that the temperature of the air within the first plenum chambers 31 of the plenum means 25 is substantially 90° Farenheit. While the side members 39 substantially contact the floor 21, it should be noted that they do not touch the floor 21. That is, the side members 39 extend downward toward the floor 21 but lack about 6" of touching to allow free movement of the birds in and out of the plenum chamber 31. The chicks should not be allowed to come in contact with the side members 39 because they could damage the side member 39. The main purpose of the side members 39 is to hold the conditioned air in the primary area of where the birds are. It is important to the system that the air leaving the plenum chamber 31 goes on out from under the side members 39 to condition the air just beyond the plenum chamber 31 to within 10° Farenheit or so of the birds primary living environment (i.e., beneath the plenum chamber 31). The birds traveling from the higher temperature beneath the plenum chamber 31 to a relatively cooler but adequate temperature to eat and drink will stimulate growth and better feed conversion. The flexible side members 39 will allow the chicks to pass in and out of the first plenum chamber 31. After about two weeks, the chicks will have grown to a sufficient size that the temperature can be reduced to about 85° Farenheit and the plenum means 25 can be lifted above the floor a few more inches to give the growing chicks sufficient room to pass in and out of the first plenum chamber 31. After about three weeks, the plenum means 25 should be lifted about 18 inches above the floor 21. The temperature within the first plenum chamber 31 can sequentially be lowered and the height of the plenum means 25 sequentially be raised throughout the growing cycle as the chicks grow.

The present invention actually provides a primary and a secondary living area within the poultry house 13. The birds will congregate where the temperature is most comfortable. If the whole house 13 is a comfortable temperature they will be all over the house 13. An object of the present invention is to reduce the heating cost by reducing the area heated. The concept is to reduce the heating problem down to a primary heated area, where the birds actually live and sleep, and also to a secondary heated area, where the birds eat and drink. The heated air that spills from under the side members 39 tempers this secondary heated area with relatively free heat. As the birds grow they need more room for the primary living area. The plenum means 25 is raised slightly as management prefers by the winch means 77, to whatever height will permit enough heat to spill from under the side members 39 to warm more of the floor 21, thereby providing more actual primary living area for the larger birds. There is no specific height that is correct. The system is designed so that each manager can take everything into consideration, such as, weather, size of birds, age of house, type of house. These all play a part in how much heat should spill out. The side members 39 are flexible to reduce cost and prevent accidental injury to personnel working under members 27, 29 when they are raised for cleaning, etc. At this time all equipment in the house 13 is raised up to the ceiling.

Although the invention has been described and illustrated with respect to a preferred embodiment thereof, it is not to be so limited since changes and modifications can be made therein which are within the full intended scope of the invention.

I claim:

1. Air conditioning system for a house comprising said air conditioning system a plenum means for extending substantially the entire length of the house and air conditioning means for forcing conditioned air through said plenum means, said plenum means including a first plenum chamber and a second plenum chamber, said first plenum chamber having an opened bottom, said air conditioning means including a conduit means for allowing conditioned air to enter said second plenum chamber, said second plenum chamber being movable between an expanded position when air is being forced therethrough and a collasped position when air is not being forced therethrough, said plenum means including control transfer means for allowing conditioned air to pass from said second plenum chamber to said first plenum chamber at a controlled rate, said control transfer means includes an elongated channel member extending lengthwise of said plenum means and located between said first and second plenum chamber, said channel member having a plurality of spaced-apart apertures therethrough for allowing air to pass from said second plenum chamber to said first plenum chamber; and in which said control transfer means includes a slide member provided adjacent said channel member for selectively closing portions of said apertures through said channel member to control the flow of air therethrough, said slide member having a plurality of spaced-apart apertures therethrough that substantially correspond in size and spacing to said apertures through said channel member.

* * * * *